United States Patent
Burich

(10) Patent No.: US 7,560,059 B2
(45) Date of Patent: Jul. 14, 2009

(54) PROCESS AND METHOD FOR RECYCLING CIGARETTE BUTTS

(76) Inventor: Blake Burich, 6796 Monticello La., Dublin, OH (US) 43016

( * ) Notice: Subject to any disclaimer, the term of this patent is extended or adjusted under 35 U.S.C. 154(b) by 669 days.

(21) Appl. No.: 11/230,257

(22) Filed: Sep. 19, 2005

(65) Prior Publication Data

US 2009/0113789 A1 May 7, 2009

(51) Int. Cl.
- *B29B 13/00* (2006.01)
- *B29B 13/10* (2006.01)
- *B29B 17/00* (2006.01)
- *B29B 17/02* (2006.01)

(52) U.S. Cl. .......... 264/138; 264/239; 264/319; 264/343; 264/344; 264/911; 264/914; 162/29; 131/96

(58) Field of Classification Search ........... 264/911, 264/914, 138, 239, 319, 343, 344; 493/39–50; 162/29; 131/96

See application file for complete search history.

(56) References Cited

U.S. PATENT DOCUMENTS

| | | | | | |
|---|---|---|---|---|---|
| 1,897,878 | A | * | 2/1933 | Allen | 536/78 |
| 2,159,704 | A | * | 5/1939 | Harold | 131/95 |
| 4,007,084 | A | | 2/1977 | Chan et al. | 162/167 |
| 4,372,749 | A | * | 2/1983 | Nielsen | 44/589 |
| 4,457,317 | A | * | 7/1984 | Thompson et al. | 131/96 |
| 4,881,555 | A | | 11/1989 | Bolt et al. | 131/335 |
| 5,328,934 | A | * | 7/1994 | Schiraldi | 521/40 |
| 5,504,119 | A | * | 4/1996 | Hopkins, Jr. | 521/40 |
| 5,992,621 | A | | 11/1999 | Grant et al. | 206/246 |
| 6,719,880 | B2 | | 4/2004 | Speaks et al. | 162/72 |
| 2005/0005945 | A1 | | 1/2005 | Shaw et al. | |

FOREIGN PATENT DOCUMENTS

KR 2001067658 A * 7/2001
WO WO 9910680 A1 * 3/1999

* cited by examiner

*Primary Examiner*—Joseph S. Del Sole
*Assistant Examiner*—Timothy Kennedy
(74) *Attorney, Agent, or Firm*—Standley Law Group LLP

(57) ABSTRACT

A process and method for recycling cigarette butts is disclosed. The process and method involves reacting ground cigarette butts with a solvent and mineral spirits and then shaping and drying the resultant product. Once the processed cigarette butts have hardened or cured the material may be formed into useful objects with no leaching of chemicals upon contact with water.

15 Claims, 2 Drawing Sheets

PROCESS AND METHOD FOR RECYCLING CIGARETTE BUTTS

BACKGROUND AND SUMMARY OF THE INVENTION

The present invention relates generally to a process for recycling a paper containing by-product. More particularly, the present invention relates to a process and method for recycling cigarette butts.

According to sources, there are over 176,000,000 pounds of discarded cigarette butts in the United States each year. Each cigarette butt can take up to ten years to biodegrade. According to the Center for Marine Conservation, cigarette butt litter accounts for one in every five items collected on cleanups. A cigarette is often littered within ten feet of a permanent ashtray and now that most buildings do not allow smoking inside, the problem of discarded butts on sidewalks, entryways, and in courtyards is increasing.

Cigarette filters are composed of a bundle of 12,000 plastic-like cellulose acetate fibers. It can take years, for the fibers to decay into a plastic powder that can't be seen. The nicotine trapped inside 200 used filters is sufficient to kill an adult human (about 50 to 60 milligrams). Young children sometimes ingest cigarette butts that are discarded on the ground and become ill. The chemicals left behind in a cigarette butt can leak into water and sewer systems.

The present invention is directed to a process and method for recycling cigarette butts. Once the processed cigarette butts have hardened or cured the material may be formed into useful objects with no leaching of chemicals upon contact with water.

In accordance with a preferred embodiment of the invention, ground cigarette butts are contacted with a solvent and a crude petroleum product or mineral spirits. That mixture is then added to a form or a mold to form a useful article. The article may be centrifuged or compressed to reclaim unevaporated solvent. The formed or molded product may air dry at ambient temperature or heat may be added to quicken the drying process.

In addition to the novel features and advantages mentioned above, other features and advantages of the present invention will be readily apparent from the following descriptions and exemplary embodiments.

DETAILED DESCRIPTION OF EXEMPLARY EMBODIMENT(S)

Example 1

Figure 1:
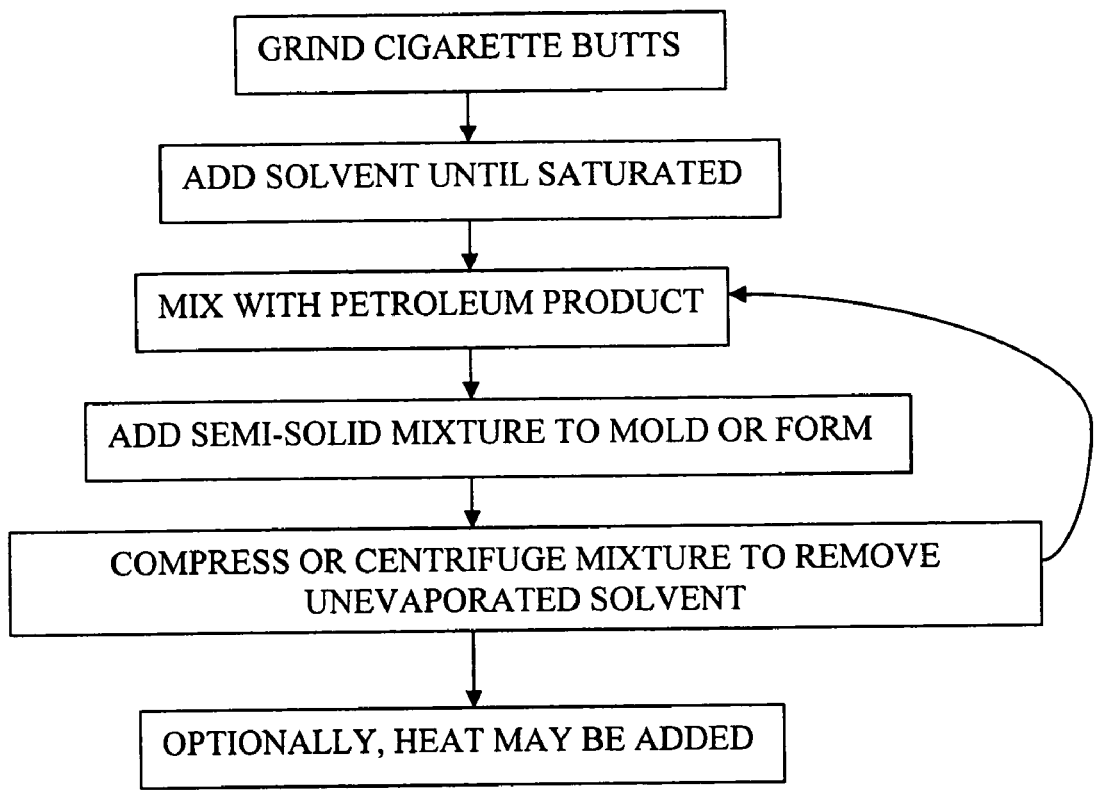
FIG. 1 is a flow chart of an exemplary embodiment of a process of the present invention.
Figure 2:
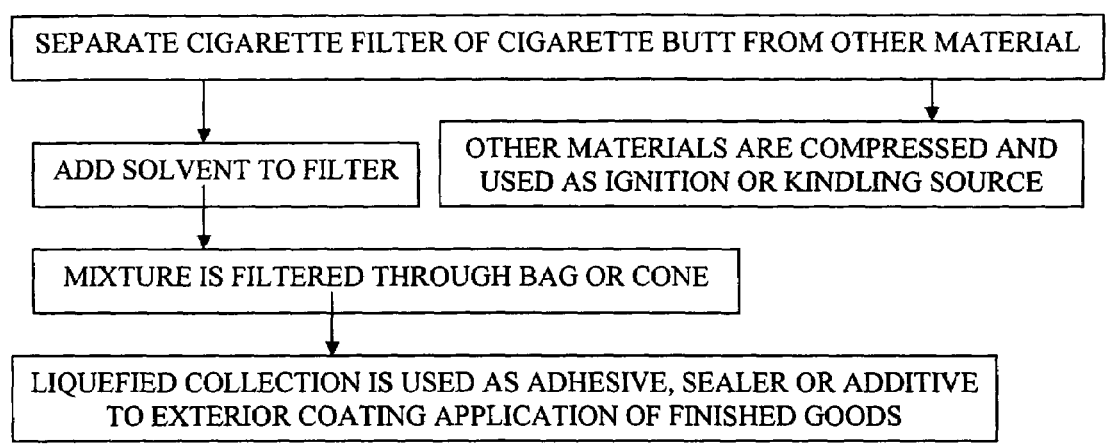
FIG. 2 is a flow chart of an exemplary embodiment of a process of the present invention.

Approximately, 100 ground untreated cigarette butts are stirred in approximately 125-150 ml of a solvent until saturated. Any solvent known in the art may be used. Preferably, acetone is used as the solvent. The resulting mixture is mixed with approximately 10-25 ml of Varnish Maker's and Painter's Naphtha (hereinafter "VM&P Naphtha") (an example may be supplied by Bennette Paint Mfg. Co., Inc., Hampton, Va.) or mineral spirits. This results in a semi-solid mixture. The semi-solid mixture is added to a form or mold. The unevaporated solvent mixture is released upon compression or upon subjection of the article to a centrifuge. The unclaimed solvent may be re-used for the subsequent treatment of other batches of ground cigarette butts. Heat may be added to speed in the drying process.

Example 2

The filter portions of cigarette butts are separated from the other material that is typically left with a cigarette butt. This other material may be compressed and used as an ignition or kindling source. A solvent is added to the filters until solubalized. Any solvent known in the art may be used. Preferably, acetone is used as the solvent. The resulting mixture is filtered through a bag or cone to remove the residual solids. The liquefied collection is placed into a container and may be used as an adhesive, a sealer or an additive to any exterior coating application of finished goods.

Example 3

To allow for a more pure and consistent end product, the filters of cigarette butts are removed from the other material (paper, tobacco and other impurities). The filters are ground and a solvent is added until saturation. Any solvent known in the art may be used. Preferably, acetone is used as the solvent. The saturated mixture is then mixed with VM&P Naphtha or mineral spirits until a semi-solid is formed. The semi-solid material may then be added to a form or a mold. Unevaporated solvent mixture may be reclaimed upon compression or subjecting the material to the action of a centrifuge. Heat may then be added to force dry the mold or form or the mold or form may be dried at ambient temperature until a solid state is achieved.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A process for recycling cigarette butts, said process comprising:
   grinding cigarette butts;
   adding a solvent to said ground cigarette butts until saturation;
   adding a crude petroleum liquid to said solvent/ground cigarette butt mixture until a semi-solid material is achieved; and
   molding said semi-solid material.

2. The process of claim 1, further comprising the step of adding heat to said semi-solid material.

3. The process of claim 1, wherein said solvent is acetone.

4. The process of claim 1, wherein said crude petroleum liquid is selected from the group consisting of mineral spirits and VM&P Naphtha.

5. A method of recycling cigarette butts, said method comprising:
   contacting cigarette butt filters with a solvent to produce a saturated mixture; and
   filtering said saturated mixture to remove the solids to achieve a liquefied collection,
   wherein said liquefied collection is used as an adhesive, as a sealer or as an additive to any exterior coating application of finished goods.

6. The method of claim 5, wherein said filtering step is performed with a bag filter or a cone filter.

7. The method of claim 5, wherein said solvent is acetone.

8. The method of claim 5, further comprising the step of prior to contacting cigarette butt filters with a solvent, separating the filters from paper and tobacco other materials that make up a discarded cigarette butt.

9. The method of claim 8, further comprising the step of collecting and compressing said other materials to be used as an ignition or kindling source.

10. A process for recycling cigarette butt filters, said process comprising:
    separating cigarette butt filters from paper and tobacco other materials;
    grinding cigarette butt filters;
    adding a solvent to said ground cigarette butt filters until saturation;
    adding a crude petroleum liquid to said solvent/ground cigarette butt filter mixture until a semi-solid material is achieved; and
    molding said semi-solid material.

11. The process of claim 10, further comprising the step of collecting and compressing said paper and tobacco other materials to be used as an ignition source.

12. The process of claim 10, wherein said solvent is acetone.

13. The process of claim 10, further comprising the step of adding heat to said semi-solid material.

14. The process of claim 10, wherein said crude petroleum liquid is selected from the group consisting of mineral spirits and VM&P Naphtha.

15. The process of claim 10, further comprising the step of reclaiming the solvent through centrifuging or compressing said semi-solid material.

\* \* \* \* \*